(12) United States Patent
Ishikura et al.

(10) Patent No.: US 12,141,135 B2
(45) Date of Patent: *Nov. 12, 2024

(54) ANONYMITY EVALUATION APPARATUS, ANONYMITY EVALUATION METHOD, AND PROGRAM

(71) Applicant: NIPPON TELEGRAPH AND TELEPHONE CORPORATION, Tokyo (JP)

(72) Inventors: Zen Ishikura, Musashino (JP); Satoshi Hasegawa, Musashino (JP); Seiji Takahashi, Musashino (JP); Susumu Kakuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 17/291,279

(22) PCT Filed: Feb. 20, 2020

(86) PCT No.: PCT/JP2020/006713
§ 371 (c)(1),
(2) Date: May 5, 2021

(87) PCT Pub. No.: WO2020/175305
PCT Pub. Date: Sep. 3, 2020

(65) Prior Publication Data
US 2022/0004544 A1      Jan. 6, 2022

(30) Foreign Application Priority Data
Feb. 26, 2019   (JP) .................................. 2019-032452

(51) Int. Cl.
*G06F 21/62*    (2013.01)
*G06F 16/22*    (2019.01)
(Continued)

(52) U.S. Cl.
CPC ........ *G06F 16/244* (2019.01); *G06F 16/2282* (2019.01); *G06F 16/2457* (2019.01); *G06F 16/248* (2019.01); *G06F 21/6254* (2013.01)

(58) Field of Classification Search
None
See application file for complete search history.

(56) References Cited

U.S. PATENT DOCUMENTS

2009/0204631 A1*  8/2009  Pomroy .............. G06F 21/6227
                                                                    707/999.102
2010/0131476 A1*  5/2010  Kataoka ............ G06F 16/90335
                                                                    707/693
(Continued)

FOREIGN PATENT DOCUMENTS

JP    2012-79205 A   *   4/2012
JP    2016151936 A   *   8/2016
(Continued)

OTHER PUBLICATIONS

Privacy-Preserving Deletion to Generalization-based Anonymous Database, Shah et al.(Year: 2012).*

(Continued)

*Primary Examiner* — Augustine K. Obisesan
(74) *Attorney, Agent, or Firm* — XSENSUS LLP

(57) ABSTRACT

A technique of calculating evaluation values regarding anonymity for a table obtained by anonymizing an arbitrary table is provided. An anonymity evaluation apparatus includes an evaluation target table generation part configured to generate a first evaluation target table of p×L including L records which are sets of values of p master (Continued)

attributes different from each other from a table to be anonymized of M×N and generate a second evaluation target table of p×L by anonymizing the p master attributes in the first evaluation target table from an anonymized table of M×N by anonymizing the p master attributes in the table to be anonymized, where M is the number of attributes, N is the number of records, p is the number of master attributes, and L is the number of sets of values of p master attributes which are different from each other.

5 Claims, 11 Drawing Sheets

(51) Int. Cl.
    *G06F 16/242*     (2019.01)
    *G06F 16/2457*     (2019.01)
    *G06F 16/248*     (2019.01)

(56) References Cited

U.S. PATENT DOCUMENTS

| | | | | |
|---|---|---|---|---|
| 2014/0380489 | A1* | 12/2014 | Hacid | G06F 21/6254 726/26 |
| 2017/0300542 | A1* | 10/2017 | Abe | G06F 16/24561 |
| 2018/0220160 | A1* | 8/2018 | Lu | H04N 19/30 |
| 2019/0130131 | A1* | 5/2019 | Huang | G06F 16/285 |
| 2020/0265069 | A1* | 8/2020 | Antonatos | G06F 21/6227 |

FOREIGN PATENT DOCUMENTS

| | | | |
|---|---|---|---|
| JP | 2018-55612 A | * | 4/2018 |
| JP | 6370236 B2 | * | 8/2018 |

OTHER PUBLICATIONS

PTA: An Efficient System for Transaction Database Anonymization, Lin et al. (Year: 2016).*

International Search Report and Written Opinion mailed on Apr. 28, 2020 received for PCT Application No. PCT/JP2020/006713, Filed on Feb. 20, 2020, 8 pages including English Translation.

Sweeney, "k-Anonymity: A Model for Protecting Privacy", International Journal of Uncertainty, Fuzziness and Knowledge-Based Systems, vol. 10, Issue 5, Oct. 2002, pp. 557-570.

Ikarashi et al., "A Probabilistic Extension of k-Anonymity", Computer Security Symposium(CSS2009), Oct. 2009, pp. 1-6 (12 pages including Translation).

Kikuchi et al., "Ice and Fire: Design of Data Anonymization and De-Anonymization Competition", Computer Security Symposium (CSS 2015), Oct. 21-23, 2015, pp. 363-370 (17 pages including Translation).

Qiyuan Gong, et al., "Anonymizing 1:M microdata with high utility", Knowledge-Based Systems 115 (2017), Elsevier B.V., 2016, 12 pages.

* cited by examiner

| NAME | GENDER | AGE GROUP | SHOP OF PURCHASE | PURCHASED AMOUNT |
|---|---|---|---|---|
| A | MALE | 30s | CONVENIENCE STORE | 150 |
| C | MALE | 30s | CONVENIENCE STORE | 600 |
| E | FEMALE | 30s | CONVENIENCE STORE | 800 |
| A | MALE | 30s | SUPERMARKET | 3000 |
| B | FEMALE | 30s | SUPERMARKET | 2000 |
| D | MALE | 30s | SUPERMARKET | 1000 |
| E | FEMALE | 30s | SUPERMARKET | 1500 |

FIG. 1

| NAME | ADDRESS | AGE | SHOP OF PURCHASE | AMOUNT |
|------|---------|-----|------------------|--------|
| A | MITAKA-SHI, TOKYO ... | 25 | SUPERMARKET | 750 |
| A | MITAKA-SHI, TOKYO ... | 25 | CONVENIENCE STORE | 1200 |
| B | MITAKA-SHI, TOKYO ... | 32 | SUPERMARKET | 400 |
| B | MITAKA-SHI, TOKYO ... | 32 | CONVENIENCE STORE | 2000 |
| C | MITAKA-SHI, TOKYO ... | 23 | SUPERMARKET | 3000 |
| D | YOKOSUKA-SHI, KANAGAWA-PREFECTURE ... | 28 | CONVENIENCE STORE | 12000 |
| E | YOKOSUKA-SHI, KANAGAWA-PREFECTURE ... | 36 | SUPERMARKET | 3000 |
| F | YOKOSUKA-SHI, KANAGAWA-PREFECTURE ... | 30 | CONVENIENCE STORE | 12000 |
| G | MUSASHINO-SHI, TOKYO ... | 25 | SUPERMARKET | 1200 |

FIG. 8

| NAME | ADDRESS | AGE |
|------|---------|-----|
| A | MITAKA-SHI, TOKYO ... | 25 |
| A | MITAKA-SHI, TOKYO ... | 25 |
| B | MITAKA-SHI, TOKYO ... | 32 |
| B | MITAKA-SHI, TOKYO ... | 32 |
| C | MITAKA-SHI, TOKYO ... | 23 |
| D | YOKOSUKA-SHI, KANAGAWA-PREFECTURE ... | 28 |
| E | YOKOSUKA-SHI, KANAGAWA-PREFECTURE ... | 36 |
| F | YOKOSUKA-SHI, KANAGAWA-PREFECTURE ... | 30 |
| G | MUSASHINO-SHI, TOKYO ... | 25 |

FIG. 9

| NAME | ADDRESS | AGE |
|---|---|---|
| 1 | 2 | 3 |
| 1 | 2 | 3 |
| 4 | 5 | 6 |
| 4 | 5 | 6 |
| 7 | 8 | 9 |
| 10 | 11 | 12 |
| 13 | 14 | 15 |
| 16 | 17 | 18 |
| 19 | 20 | 3 |

FIG. 10

| RECORD NUMBER | NAME | ADDRESS | AGE |
|---|---|---|---|
| 1 | 1 | 2 | 3 |
| 2 | 1 | 2 | 3 |
| 3 | 4 | 5 | 6 |
| 4 | 4 | 5 | 6 |
| 5 | 7 | 8 | 9 |
| 6 | 10 | 11 | 12 |
| 7 | 13 | 14 | 15 |
| 8 | 16 | 17 | 18 |
| 9 | 19 | 20 | 3 |

FIG. 11

| RECORD NUMBER | ENCODED DATA |
|---|---|
| 1 | [1,2,3] |
| 2 | [1,2,3] |
| 3 | [4,5,6] |
| 4 | [4,5,6] |
| 5 | [7,8,9] |
| 6 | [10,11,12] |
| 7 | [13,14,15] |
| 8 | [16,17,18] |
| 9 | [19,20,3] |

FIG. 12

| ENCODED DATA | RECORD NUMBER |
|---|---|
| [1,2,3] | 1,2 |
| [4,5,6] | 3,4 |
| [7,8,9] | 5 |
| [10,11,12] | 6 |
| [13,14,15] | 7 |
| [16,17,18] | 8 |
| [19,20,3] | 9 |

FIG. 13

| KEY | RECORD NUMBER |
|---|---|
| 1 | 1,2 |
| 3 | 3,4 |
| 5 | 5 |
| 6 | 6 |
| 7 | 7 |
| 8 | 8 |
| 9 | 9 |

FIG. 14

| RECORD NUMBER | NAME | ADDRESS | AGE | SHOP OF PURCHASE | AMOUNT |
|---|---|---|---|---|---|
| 1 | A | MITAKA-SHI, TOKYO ... | 25 | SUPERMARKET | 750 |
| 2 | A | MITAKA-SHI, TOKYO ... | 25 | CONVENIENCE STORE | 1200 |
| 3 | B | MITAKA-SHI, TOKYO ... | 32 | SUPERMARKET | 400 |
| 4 | B | MITAKA-SHI, TOKYO ... | 32 | CONVENIENCE STORE | 2000 |
| 5 | C | MITAKA-SHI, TOKYO ... | 23 | SUPERMARKET | 3000 |
| 6 | D | YOKOSUKA-SHI, KANAGAWA-PREFECTURE ... | 28 | CONVENIENCE STORE | 12000 |
| 7 | E | YOKOSUKA-SHI, KANAGAWA-PREFECTURE ... | 36 | SUPERMARKET | 3000 |
| 8 | F | YOKOSUKA-SHI, KANAGAWA-PREFECTURE ... | 30 | CONVENIENCE STORE | 12000 |
| 9 | G | MUSASHINO-SHI, TOKYO ... | 25 | SUPERMARKET | 1200 |

FIG. 15

| RECORD NUMBER | NAME | ADDRESS | AGE | SHOP OF PURCHASE | AMOUNT |
|---|---|---|---|---|---|
| 1(,2) | A | MITAKA-SHI, TOKYO ... | 25 | SUPERMARKET | 750 |
| 3(,4) | B | MITAKA-SHI, TOKYO ... | 32 | SUPERMARKET | 400 |
| 5 | C | MITAKA-SHI, TOKYO ... | 23 | SUPERMARKET | 3000 |
| 6 | D | YOKOSUKA-SHI, KANAGAWA-PREFECTURE ... | 28 | CONVENIENCE STORE | 12000 |
| 7 | E | YOKOSUKA-SHI, KANAGAWA-PREFECTURE ... | 36 | SUPERMARKET | 3000 |
| 8 | F | YOKOSUKA-SHI, KANAGAWA-PREFECTURE ... | 30 | CONVENIENCE STORE | 12000 |
| 9 | G | MUSASHINO-SHI, TOKYO ... | 25 | SUPERMARKET | 1200 |

FIG. 16

| NAME | ADDRESS | AGE | SHOP OF PURCHASE | AMOUNT |
|---|---|---|---|---|
| A | MITAKA-SHI, TOKYO ... | 25 | SUPERMARKET | 750 |
| B | MITAKA-SHI, TOKYO ... | 32 | SUPERMARKET | 400 |
| C | MITAKA-SHI, TOKYO ... | 23 | SUPERMARKET | 3000 |
| D | YOKOSUKA-SHI, KANAGAWA-PREFECTURE ... | 28 | CONVENIENCE STORE | 12000 |
| E | YOKOSUKA-SHI, KANAGAWA-PREFECTURE ... | 36 | SUPERMARKET | 3000 |
| F | YOKOSUKA-SHI, KANAGAWA-PREFECTURE ... | 30 | CONVENIENCE STORE | 12000 |
| G | MUSASHINO-SHI, TOKYO ... | 25 | SUPERMARKET | 1200 |

FIG. 17

| NAME | ADDRESS | AGE | SHOP OF PURCHASE | AMOUNT | |
|---|---|---|---|---|---|
| | MITAKA-SHI, TOKYO | 20s | SUPERMARKET | 750 | A |
| | | | | | B |
| | MITAKA-SHI, TOKYO | 20s | SUPERMARKET | 3000 | C |
| | | | | | D |
| | YOKOSUKA-SHI, KANAGAWA-PREFECTURE | 30s | SUPERMARKET | 3000 | E |
| | YOKOSUKA-SHI, KANAGAWA-PREFECTURE | 30s | CONVENIENCE STORE | 12000 | F |
| | | | | | G |

FIG. 18

| NAME | ADDRESS | AGE | SHOP OF PURCHASE | AMOUNT | |
|---|---|---|---|---|---|
| | MITAKA-SHI, TOKYO | 20s | SUPERMARKET | 750 | A |
| | MITAKA-SHI, TOKYO | 20s | CONVENIENCE STORE | 1200 | A |
| | | | | | B |
| | | | | | B |
| | MITAKA-SHI, TOKYO | 20s | SUPERMARKET | 3000 | C |
| | | | | | D |
| | YOKOSUKA-SHI, KANAGAWA-PREFECTURE | 30s | SUPERMARKET | 3000 | E |
| | YOKOSUKA-SHI, KANAGAWA-PREFECTURE | 30s | CONVENIENCE STORE | 12000 | F |
| | | | | | G |

FIG. 19

| NAME | ADDRESS | AGE |
|---|---|---|
| A | MITAKA-SHI, TOKYO ... | 25 |
| B | MITAKA-SHI, TOKYO ... | 32 |
| C | MITAKA-SHI, TOKYO ... | 23 |
| D | YOKOSUKA-SHI, KANAGAWA-PREFECTURE ... | 28 |
| E | YOKOSUKA-SHI, KANAGAWA-PREFECTURE ... | 36 |
| F | YOKOSUKA-SHI, KANAGAWA-PREFECTURE ... | 30 |
| G | MUSASHINO-SHI, TOKYO ... | 25 |

FIG. 20

| NAME | ADDRESS | AGE | |
|---|---|---|---|
| | MITAKA-SHI, TOKYO | 20s | A |
| | | | B |
| | MITAKA-SHI, TOKYO | 20s | C |
| | | | D |
| | YOKOSUKA-SHI, KANAGAWA-PREFECTURE | 30s | E |
| | YOKOSUKA-SHI, KANAGAWA-PREFECTURE | 30s | F |
| | | | G |

FIG. 21

ANONYMITY EVALUATION APPARATUS, ANONYMITY EVALUATION METHOD, AND PROGRAM

CROSS-REFERENCE TO RELATED APPLICATIONS

The present application is based on PCT filing PCT/JP2020/006713, filed Feb. 20, 2020, which claims priority to JP 2019-032452, filed Feb. 26, 2019, the entire contents of each are incorporated herein by reference.

TECHNICAL FIELD

The present invention relates to an anonymization technique.

BACKGROUND ART

In recent years, a technique called privacy preserving data mining which makes it possible to obtain a result while protecting privacy in data mining has attracted attention. Such a technique includes k-anonymization described in Non-patent literature 1 and Pk-anonymization described in Non-patent literature 2.

Processing targets in these anonymization techniques are a table as illustrated in FIG. 1. Here, the table is data including N records (where N is an integer equal to or greater than 1) which are sets of values for M attributes (where M is an integer equal to or greater than 2). Further, the record will be referred to as a row, and a set of values of a given attribute (for example, name) will be referred to as a column. For example, a first row in the table in FIG. 1 is (A, male, 30s, convenience store, 150), and a first column is (A, C, E, A, B, D, E). Further, a size of the table is expressed as M×N. For example, the table in FIG. 1 is a table of 5×7 (M=5, N=7). Attribute values included in the table will be referred to as elements of the table.

Attributes which are to be anonymized by the anonymization techniques described in Non-patent literature 1 and Non-patent literature 2 will be referred to as master attributes, and other attributes, that is, attributes which are not to be anonymized by the anonymization techniques will be referred to as history attributes. Further, deletion of a set of attribute values for a given master attribute, that is, deletion of a column will be referred to as attribute deletion. The attribute deletion is an example of the anonymization technique.

Further, Non-patent literature 3 discloses an anonymity evaluation technique of evaluating the anonymization techniques disclosed in Non-patent literature 1 and Non-patent literature 2.

PRIOR ART LITERATURE

Non-Patent Literature

Non-patent literature 1: Latanya Sweeney, "k-anonymity: a model for protecting privacy", International Journal of Uncertainty, Fuzziness and Knowledge-Based Systems, Vol. 10, Issue 5, October 2002.

Non-patent literature 2: Dai Ikarashi, Koji Chida, Katsumi Takahashi, "A Probabilistic Extension of k-Anonymity", Computer Security Symposium 2009 (CSS2009), pp. 1-6, October 2009.

Non-patent literature 3: Hiroaki Kikuchi, Takayasu Yamaguchi, Koki Hamada, Yuji Yamaoka, Hidenobu Oguri, Jun Sakuma, "Ice & Fire: Design of Data Anonymization and De-Anonymization Competition", CSS 2015, pp. 363-370, 2015.

SUMMARY OF THE INVENTION

Problems to be Solved by the Invention

The anonymization techniques described in Non-patent literature 1 and Non-patent literature 2 protect data by performing anonymization processing on a table constituted with special records, in which sets of values of master attributes correspond to sets of values of history attributes on a one-to-one basis. Further, the anonymity evaluation technique described in Non-patent literature 3 evaluates an anonymization technique which is to be applied to a table constituted with special records, in which sets of values of master attributes correspond to sets of values of history attributes on a one-to-one basis. Thus, for example, the anonymity evaluation technique described in Non-patent literature 3 cannot be applied as is to evaluation of anonymity of anonymization which is performed on the table in FIG. 1 using k-anonymization while three attributes of name, gender and age group are set as the master attributes and two attributes of a shop of purchase and a purchased amount are set as the history attributes. In other words, the anonymity evaluation technique described in Non-patent literature 3 cannot calculate evaluation values regarding anonymity for a table other than a table constituted with special records, in which sets of values of master attributes correspond to sets of values of history attributes on a one-to-one basis.

The present invention is therefore directed to providing a technique of calculating evaluation values regarding anonymity for a table obtained by anonymizing an arbitrary table.

Means to Solve the Problems

One aspect of the present invention includes an evaluation target table generation part configured to generate a first evaluation target table of p×L including L records which are sets of values of p master attributes different from each other from a table to be anonymized of M×N and generate a second evaluation target table of p×L by anonymizing the p master attributes in the first evaluation target table from an anonymized table of M×N by anonymizing the p master attributes in the table to be anonymized, where M is an integer equal to or greater than 2 representing a number of attributes, N is an integer equal to or greater than 1 representing a number of records, p is an integer equal to or greater than 1 and equal to or less than M representing a number of master attributes, and L is an integer equal to or greater than 1 and equal to or less than N representing a number of sets of values of p master attributes which are different from each other; and an evaluation value calculation part configured to calculate evaluation values regarding q ($q \leq p$) master attributes which are evaluation targets from the first evaluation target table and the second evaluation target table.

Effects of the Invention

According to the present invention, it is possible to calculate evaluation values regarding anonymity for a table obtained by anonymizing an arbitrary table.

BRIEF DESCRIPTION OF THE DRAWINGS

FIG. 1 is a view illustrating an example of a table to be anonymized;

FIG. 8 is a view illustrating an example of a table to be anonymized;

FIG. 9 is a view illustrating an example of a table obtained in the process of generation of an encoded table;

FIG. 10 is a view illustrating an example of the encoded table;

FIG. 11 is a view illustrating an example of a table obtained in the process of generation of an overlapping record number table;

FIG. 12 is a view illustrating an example of a table obtained in the process of generation of the overlapping record number table;

FIG. 13 is a view illustrating an example of a table obtained in the process of generation of the overlapping record number table;

FIG. 14 is a view illustrating an example of the overlapping record number table;

FIG. 15 is a view illustrating an example of a table obtained in the process of generation of a partial table;

FIG. 16 is a view illustrating an example of a table obtained in the process of generation of the partial table;

FIG. 17 is a view illustrating an example of the partial table;

FIG. 18 is a view illustrating an example of an anonymized partial table;

FIG. 19 is a view illustrating an example of an anonymized table;

FIG. 20 is a view illustrating an example of a first evaluation target table; and FIG. 21 is a view illustrating an example of a second evaluation target table.

DETAILED DESCRIPTION OF THE EMBODIMENTS

Figure 2:
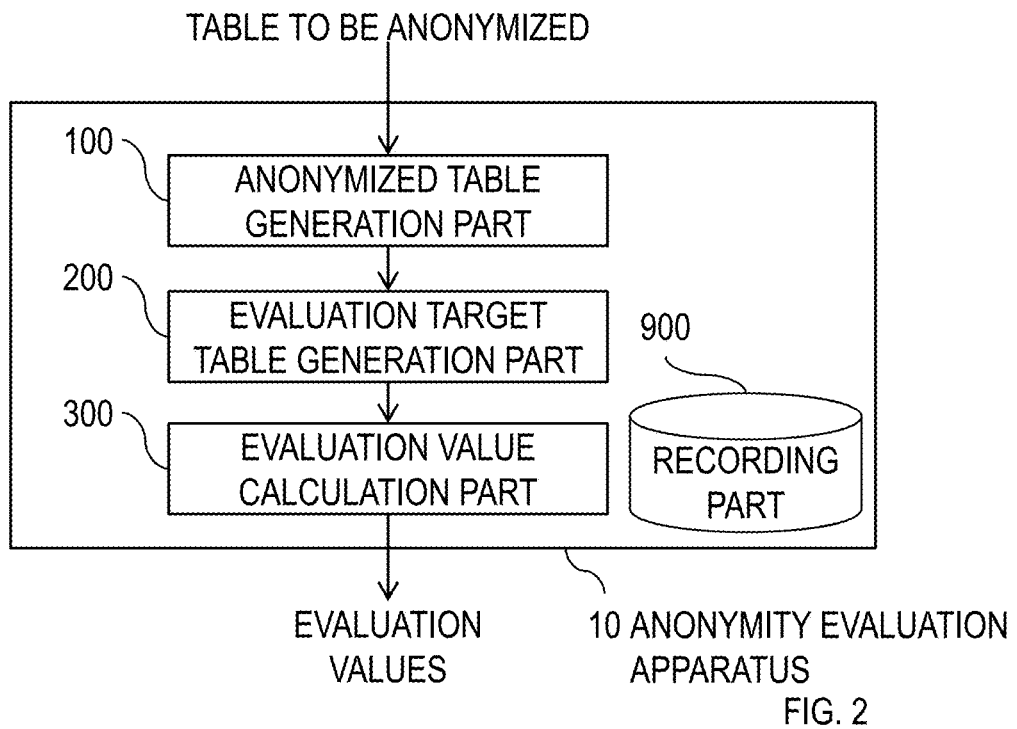
FIG. 2 is a block diagram illustrating an example of a configuration of an anonymity evaluation apparatus 10.

Embodiments of the present invention will be described in detail below. Note that the same reference numerals will be assigned to components having the same functions, and repetitive description will be omitted.

First Embodiment

M is set as an integer equal to or greater than 2 representing the number of attributes, N is set as an integer equal to or greater than 1 representing the number of records, p is set as an integer equal to or greater than 1 and equal to or less than M representing the number of master attributes, and L is set as an integer equal to or greater than 1 and equal to or less than N representing the number of sets of values of p master attributes which are different from each other. An anonymity evaluation apparatus 10 calculates evaluation values regarding anonymity from a table (table to be anonymized) of M×N which is an anonymization processing target.

Figure 3:
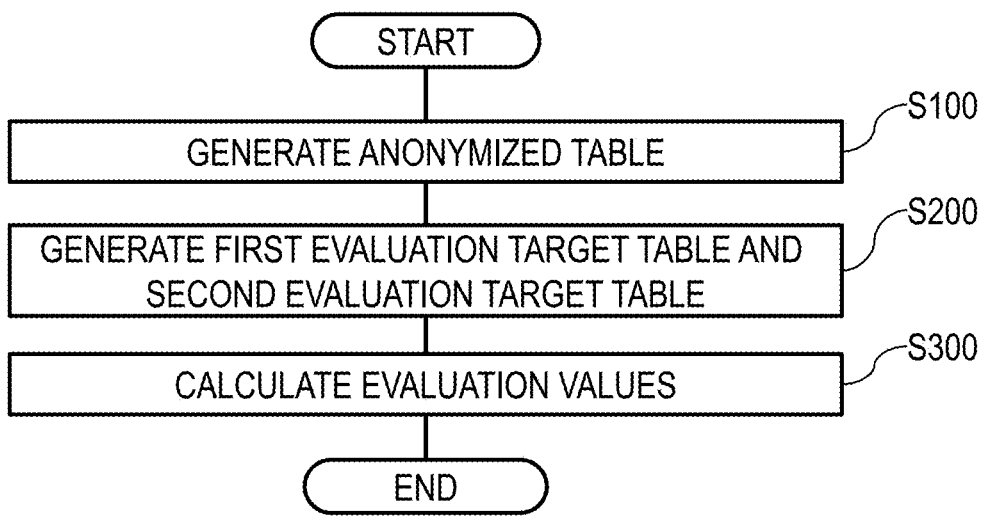
FIG. 3 is a flowchart illustrating an example of operation of the anonymity evaluation apparatus 10.

The anonymity evaluation apparatus 10 will be described below with reference to FIG. 2 and FIG. 3. FIG. 2 is a block diagram illustrating a configuration of the anonymity evaluation apparatus 10. FIG. 3 is a flowchart illustrating operation of the anonymity evaluation apparatus 10. As illustrated in FIG. 2, the anonymity evaluation apparatus 10 includes an anonymized table generation part 100, an evaluation target table generation part 200, an evaluation value calculation part 300, and a recording part 900. The recording part 900 records information necessary for processing of the anonymity evaluation apparatus 10 as appropriate. The recording part 900, for example, records a table such as a table to be anonymized, which is generated in the process of processing by the anonymity evaluation apparatus 10.

The operation of the anonymity evaluation apparatus 10 will be described in accordance with FIG. 3.

In S100, the anonymized table generation part 100 receives input of a table to be anonymized of M×N, generates an anonymized table of M×N from the table to be anonymized by anonymizing p master attributes in the table to be anonymized, and outputs the anonymized table.

Figure 4:
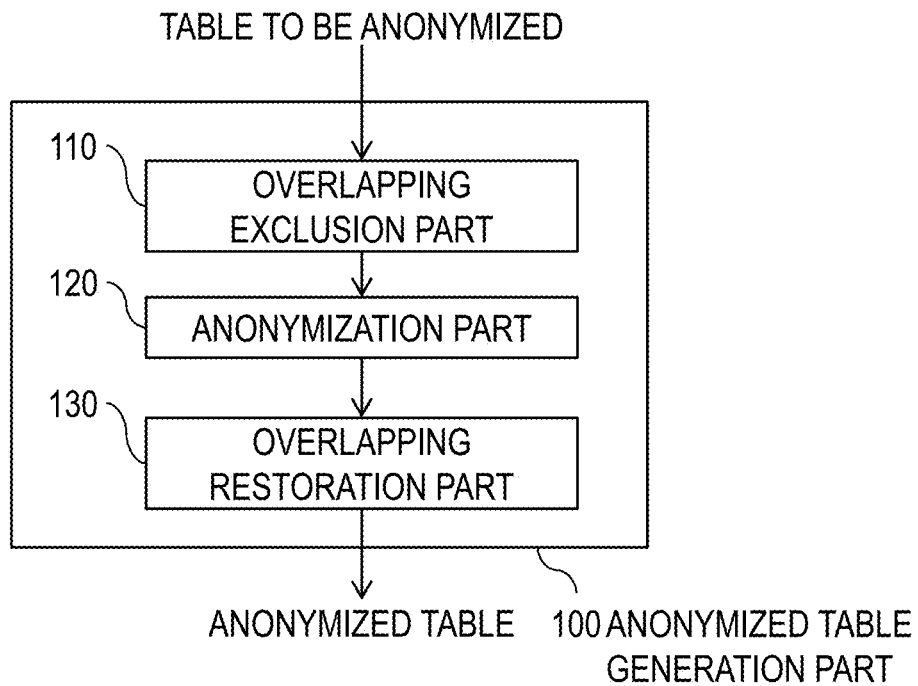
FIG. 4 is a block diagram illustrating an example of a configuration of an anonymized table generation part 100.
Figure 5:
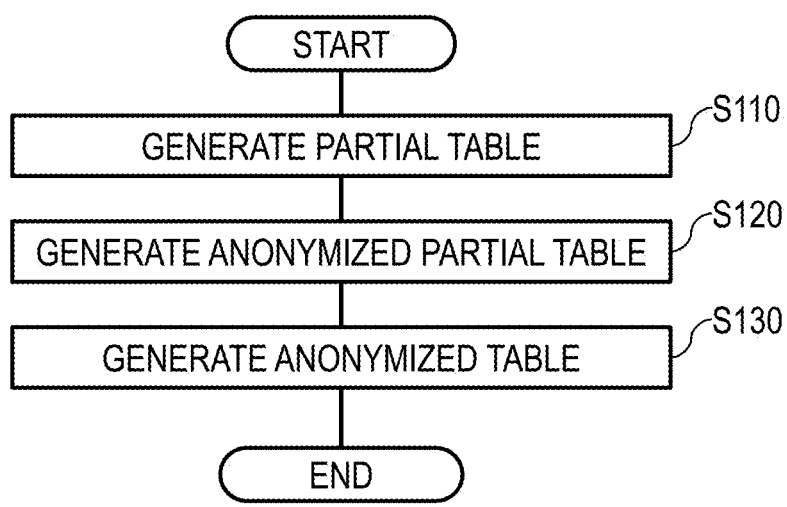
FIG. 5 is a flowchart illustrating an example of operation of the anonymized table generation part 100.

The anonymized table generation part 100 will be described below with reference to FIG. 4 and FIG. 5. FIG. 4 is a block diagram illustrating a configuration of the anonymized table generation part 100. FIG. 5 is a flowchart illustrating operation of the anonymized table generation part 100. As illustrated in FIG. 4, the anonymized table generation part 100 includes an overlapping exclusion part 110, an anonymization part 120 and an overlapping restoration part 130.

The operation of the anonymized table generation part 100 will be described in accordance with FIG. 5.

Figure 6:
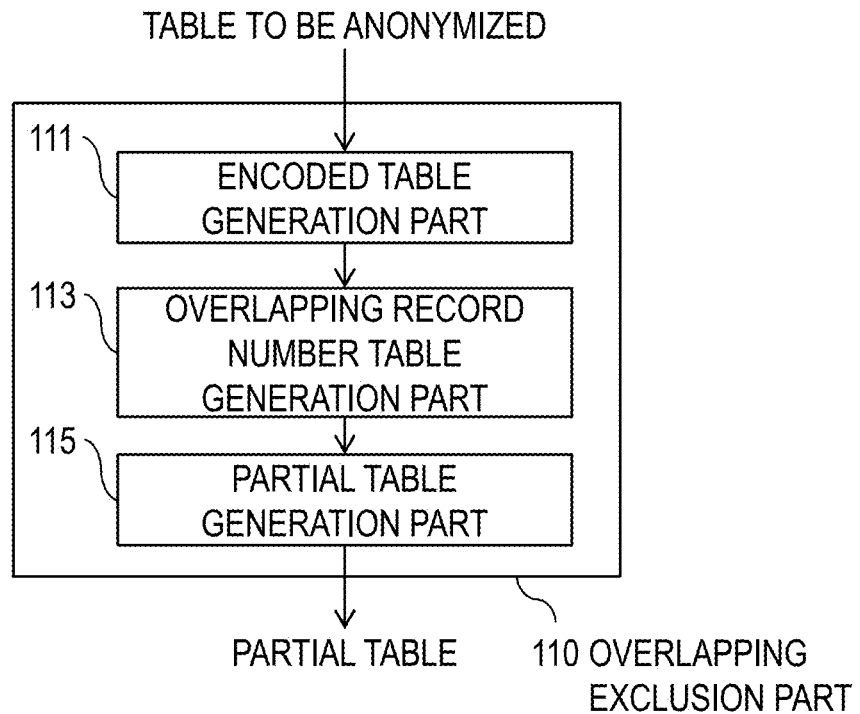
FIG. 6 is a block diagram illustrating an example of a configuration of an overlapping exclusion part 110.
Figure 7:
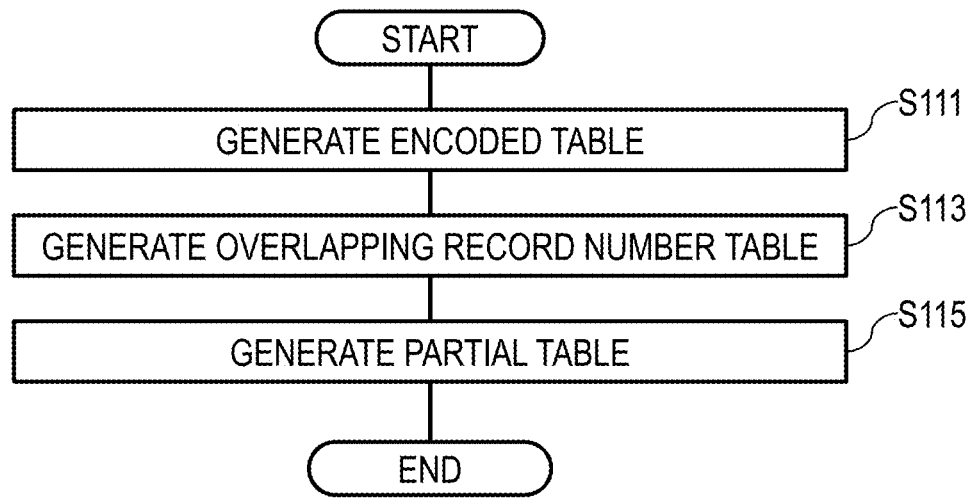
FIG. 7 is a flowchart illustrating an example of operation of the overlapping exclusion part 110.

In S110, the overlapping exclusion part 110 receives input of the table to be anonymized of M×N, generates a partial table of M×L including L records of the table to be anonymized, which have sets of values of p master attributes different from each other, from the table to be anonymized and outputs the partial table. The overlapping exclusion part 110 will be described below with reference to FIG. 6 and FIG. 7. FIG. 6 is a block diagram illustrating a configuration of the overlapping exclusion part 110. FIG. 7 is a flowchart illustrating operation of the overlapping exclusion part 110. As illustrated in FIG. 6, the overlapping exclusion part 110 includes an encoded table generation part 111, an overlapping record number table generation part 113, and a partial table generation part 115.

The operation of the overlapping exclusion part 110 will be described in accordance with FIG. 7.

In S111, the encoded table generation part 111 generates a master attribute table of p×N including N records which are sets of values of p master attributes, from the table to be anonymized and generates an encoded table of p×N by encoding the values of the master attribute table. This will be described below using specific examples of respective tables. First, the encoded table generation part 111 generates a master attribute table in FIG. 9 from the table to be anonymized in FIG. 8. The encoded table generation part 111 then generates an encoded table in FIG. 10 from the master attribute table in FIG. 9. The encoded table is a table obtained through encoding in accordance with a rule of allocating the same integer value to elements having the same value in the master attribute table.

In S113, the overlapping record number table generation part 113 generates an overlapping record number table of 2×L having records of sets of aggregates of record numbers of records of the table to be anonymized which have the same sets of values of p master attributes and values of keys which are elements (for example, minimum values of the aggregates) of the aggregates, from the encoded table generated in S111. Here, the record number is a number identifying a record included in the table to be anonymized. This will be described below using specific examples of respective tables. First, the overlapping record number table generation part 113 generates an encoded table with record numbers in FIG. 11 from the encoded table in FIG. 10. The encoded table with record numbers is a table of (p+1)×N obtained by adding a column of record numbers to the encoded table. The overlapping record number table generation part 113 then generates an overlapping record number table in FIG. 14 from the encoded table with record numbers in FIG. 11. In this event, the overlapping record number table generation part 113 generates the overlapping record number table by, for example, generating a table of 2×N using a map structure illustrated in FIG. 12 or a table of 2×L using a map structure illustrated in FIG. 13. Here, the map structure is a data structure which collectively stores a plurality of values of one attribute. For example, in FIG. 12, a plurality of values such as [1, 2, 3] and [4, 5, 6] are stored as one element for an attribute of encoded data.

In S115, the partial table generation part 115 generates a partial table from the table to be anonymized and the overlapping record number table generated in S113. This will be described below using specific examples of respective tables. First, the partial table generation part 115 generates a table to be anonymized with record numbers in FIG. 15 from the table to be anonymized in FIG. 8. The table to be anonymized with record numbers is a table of (M+1)×N obtained by adding a column of record numbers to the table to be anonymized. The partial table generation part 115 then generates a partial table in FIG. 17 from the table to be anonymized with record numbers in FIG. 15 and the overlapping record number table in FIG. 14. In this event, the partial table generation part 115 generates the partial table by, for example, generating a partial table with record numbers in FIG. 16.

In S120, the anonymization part 120 receives input of the partial table generated in S110, generates an anonymized partial table of M×L from the partial table by anonymizing p master attributes in the partial table, and outputs the anonymized partial table. This will be described below using specific examples of respective tables. The anonymization part 120 generates an anonymized partial table in FIG. 18 from a partial table in FIG. 17. The anonymized partial table in FIG. 18 is obtained by deleting attributes of name, generalizing address and age, and performing k-anonymization while setting k=2.

Note that anonymization may be performed using Pk-anonymization other than attribute deletion, generalization and k-anonymization. Further, record shuffle of changing the order (up and down) of records may be used. In a case where anonymization including processing of changing the order of records such as record shuffle is performed, the anonymization part 120 generates a table representing transition of record numbers.

In S130, the overlapping restoration part 130 receives input of the table to be anonymized, the anonymized partial table generated in S120 and the overlapping record number table generated in S110, generates an anonymized table from the table to be anonymized and the anonymized partial table using the overlapping record number table, and outputs the anonymized table. This will be described below using specific examples of respective tables. The overlapping restoration part 130 generates an anonymized table in FIG. 19 from the anonymized partial table in FIG. 18.

Note that in a case where anonymization including processing of changing the order of records is performed in S120, the overlapping restoration part 130 receives input of the table to be anonymized, the anonymized partial table generated in S120, the overlapping record number table generated in S110 and the table representing transition of the record numbers generated in S120, generates the anonymized table from the table to be anonymized and the anonymized partial table using the overlapping record number table and the table representing transition of the record numbers, and outputs the anonymized table.

In S200, the evaluation target table generation part 200 receives input of the table to be anonymized, the anonymized table generated in S100 and the overlapping record number table generated in S100, generates a first evaluation target table of p×L including L records which are sets of values of p master attributes which are different from each other, from the table to be anonymized and the overlapping record number table, generates a second evaluation target table of p×L from the anonymized table and the overlapping record number table by anonymizing the p master attributes in the first evaluation target table, and outputs the first evaluation target table and the second evaluation target table. This will be described below using specific examples of respective tables. The evaluation target table generation part 200 generates a first evaluation target table in FIG. 20 from the table to be anonymized in FIG. 8 and the overlapping record number table in FIG. 14. Further, the evaluation target table generation part 200 generates a second evaluation target table in FIG. 21 from the anonymized table in FIG. 19 and the overlapping record number table in FIG. 14.

In S300, the evaluation value calculation part 300 receives input of the first evaluation target table generated in S200 and the second evaluation target table generated in S200, calculates evaluation values regarding q (q≤p) master attributes which are evaluation targets from the first evaluation target table and the second evaluation target table, and outputs the evaluation values. The calculation method described in Non-patent literature 3 can be used to calculate the evaluation values. Further, statistic such as an average and frequency may be used. For example, an evaluation value 1 is obtained for the first evaluation target table in FIG. 20, and an evaluation value 2 is obtained for the second evaluation target table in FIG. 21 by using k-anonymity evaluation.

While the anonymity evaluation apparatus 10 receives input of the table to be anonymized, generates the anonymized table, then, generates the first evaluation target table and the second evaluation target table and calculates the evaluation values, a configuration of the anonymity evaluation apparatus is not limited to this. For example, it is also possible to constitute as an anonymity evaluation apparatus 20 (not illustrated) which receives input of the table to be anonymized and the anonymized table, generates the first evaluation target table and the second evaluation target table, and calculates the evaluation values. In this case, the anonymity evaluation apparatus 20 includes an evaluation target table generation part 200, an evaluation value calculation part 300 and a recording part 900. Further, it is only necessary that the anonymization apparatus 10 generates in advance the anonymized table out of the table to be anonymized and the anonymized table which are to be input to the anonymity evaluation apparatus 20. The anonymization apparatus 10 includes an overlapping exclusion part 110, an anonymization part 120, an overlapping restoration part 130, and a recording part 190 (not illustrated). The recording part 190 records information necessary for processing of the anonymization apparatus 10 as appropriate.

According to the embodiment of the present invention, it is possible to calculate evaluation values regarding anonymity for a table obtained by anonymizing an arbitrary table.

APPENDIX

The apparatus of the present invention includes an input part to which a keyboard, or the like, can be connected, an output part to which a liquid crystal display, or the like, can be connected, a communication part to which a communication apparatus (for example, a communication cable) which can perform communication with outside of hardware entity can be connected, a CPU (Central Processing Unit, which may include a cache memory, a register, or the like), a RAM and a ROM which are memories, an external storage apparatus which is a hard disk, and a bus which connects these input part, output part, communication part, CPU, RAM, ROM, and external storage apparatus so as to be able to exchange data among them, for example, as single hardware entity. Further, as necessary, it is also possible to provide an apparatus (drive), or the like, which can perform read/write from/to a recording medium such as a CD-ROM, at the hardware entity. Examples of physical entity including such hardware resources can include a general-purpose computer.

At the external storage apparatus of the hardware entity, a program which is necessary for realizing the above-described functions and data, or the like, which are necessary for processing of this program are stored (the apparatus is not limited to the external storage apparatus, and, a program may be stored in, for example, a ROM which is a read-only storage apparatus). Further, data, or the like, obtained through processing of these programs are stored in a RAM, an external storage apparatus, or the like, as appropriate.

At the hardware entity, each program stored in the external storage apparatus (or the ROM, or the like), and data necessary for processing of each program are read to a memory as necessary, and interpretive execution and processing are performed at the CPU as appropriate. As a result, the CPU implements predetermined functions (respective components indicated above as parts, means, or the like).

The present invention is not limited to the above-described embodiment and can be changed as appropriate within the scope not deviating from the gist of the present invention. Further, the processing described in the above-described embodiment may be executed parallelly or individually in accordance with processing performance of apparatuses which execute processing or as necessary as well as being executed in chronological order in accordance with description order.

As described above, in a case where the processing functions at the hardware entity (the apparatus of the present invention) described in the above-described embodiment are implemented with a computer, processing content of the functions which should be provided at the hardware entity is described with a program. Then, by this program being executed by the computer, the processing functions at the hardware entity are implemented on the computer.

The program describing this processing content can be recorded in a computer-readable recording medium. As the computer-readable recording medium, for example, any medium such as a magnetic recording apparatus, an optical disk, a magnetooptical recording medium and a semiconductor memory may be used. Specifically, for example, it is possible to use a hard disk apparatus, a flexible disk, a magnetic tape, or the like, as the magnetic recording apparatus, and use a DVD (Digital Versatile Disc), a DVD-RAM (Random Access Memory), a CD-ROM (Compact Disc Read Only Memory), a CD-R (Recordable)/RW (ReWritable), or the like, as the optical disk, use an MO (Magneto-Optical disc), or the like, as the magnetooptical recording medium, and use an EEP-ROM (Electronically Erasable and Programmable-Read Only Memory), or the like, as the semiconductor memory.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage apparatus of a server computer and transferred from the server computer to other computers via a network.

A computer which executes such a program, for example, first, stores a program recorded in the portable recording medium or a program transferred from the server computer in the storage apparatus of the own computer once. Then, upon execution of the processing, this computer reads the program stored in the storage apparatus of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which implements processing functions only by an instruction of execution and acquisition of a result without the program being transferred from the server computer to this computer. Note that, it is assumed that the program in this form includes information which is to be used for processing by an electronic computer, and which is equivalent to a program (not a direct command to the computer, but data, or the like, having property specifying processing of the computer).

Further, while, in this form, the hardware entity is constituted by a predetermined program being executed on the computer, at least part of the processing content may be implemented with hardware.

The above description of the embodiment of the present invention is presented for illustrative and descriptive purpose. The description is neither intended to provide exhaustive description, nor intended to limit the invention to the disclosed strict form. Modifications and variation are possible from the above-described teaching. The embodiment is selected and expressed so as to provide the best example of the principle of the present invention and so as to enable a person skilled in the art in this field to utilize the present invention in various embodiments or by adding various modifications so as to be suitable for deliberated actual use. All such modifications and variations are within the scope of the present invention defined in the attached claims interpreted in accordance with a rightly, legally and fairly provided range.

What is claimed is:
1. An anonymity evaluation apparatus to evaluate anonymity of anonymized tables used in data mining, comprising:

processing circuitry configured to
generate, from a table to be anonymized of M×N, an anonymized table of M×N by anonymizing p master attributes in the table to be anonymized, M being an integer equal to or greater than 2 and representing a number of attributes, N being an integer equal to or greater than 1 and representing a number of records, p being an integer equal to or greater than 1 and equal to or less than M, p representing a number of master attributes, M-p representing a number of history attributes, the master attributes being attributes that are to be anonymized including at least names, ages, and addresses of persons in the records, the history attributes being attributes that are not to be anonymized including shops of purchase and monetary amounts in the records,
generate a first evaluation target table of p×L including L records which are sets of values of p master attributes different from each other from the table to be anonymized and generate a second evaluation target table of p×L by anonymizing the p master attributes in the first evaluation target table from the anonymized table L being an integer equal to or greater than 1 and equal to or less than N, L representing a number of sets of values of p master attributes which are different from each other,
calculate evaluation values regarding q (q≤p) master attributes which are evaluation targets from the first evaluation target table and the second evaluation target table; and
output the evaluation values,
wherein to generate the anonymized table, the processing circuitry is further configured to:
generate a partial table of M×L including L records of the table to be anonymized, which have sets of values of the p master attributes different from each other,
generate an anonymized partial table of M×L from the partial table by anonymizing the p master attributes in the partial table, and
generate the anonymized table from the table to be anonymized and the anonymized partial table by anonymizing the p master attributes in the table to be anonymized, and
wherein the processing circuitry is further configured to perform attribute deletion, generalization, k-anonymization, Pk-anonymization, or shuffling of an order of L records in the partial table in the anonymization of the table to be anonymized.

2. The anonymity evaluation apparatus according to claim 1,
wherein the processing circuitry generates the first evaluation target table and the second evaluation target table using an overlapping record number table, a record number being a number identifying a record included in the table to be anonymized, the overlapping record number table being a table of 2×L having records of sets of aggregates of record numbers of records of the table to be anonymized which have same sets of values of p master attributes and values of keys which are elements of the aggregates.

3. An anonymity evaluation method to evaluate anonymity of anonymized tables used in data mining, comprising:
generating, by processing circuitry of an anonymity evaluation apparatus and from a table to be anonymized of M×N, an anonymized table of M×N by anonymizing p master attributes in the table to be anonymized, M being an integer equal to or greater than 2 and representing a number of attributes, N being an integer equal to or greater than 1 and representing a number of record, p being an integer equal to or greater than 1 and equal to or less than M, p representing a number of master attributes, M-p representing a number of history attributes, the master attributes being attributes that are to be anonymized including at least names, ages, and addresses of persons in the records, the history attributes being attributes that are not to be anonymized including shops of purchase and monetary amounts in the records,
generating, with the processing circuitry of the anonymity evaluation apparatus, a first evaluation target table of p×L including L records which are sets of values of p master attributes which are different from each other from the table to be anonymized of M×N and generating a second evaluation target table of p×L by anonymizing the p master attributes in the first evaluation target table from the anonymized table L being an integer equal to or greater than 1 and equal to or less than N, L representing a number of sets of values of p master attributes which are different from each other,
calculating, with the processing circuitry of the anonymity evaluation apparatus, evaluation values regarding q (q≤p) master attributes which are evaluation targets from the first evaluation target table and the second evaluation target table; and
outputting, with the processing circuitry of the anonymity evaluation apparatus, the evaluation values,
wherein to generate the anonymized table, the method further includes:
generating a partial table of M×L including L records of the table to be anonymized, which have sets of values of the p master attributes different from each other,
generating an anonymized partial table of M×L from the partial table by anonymizing the p master attributes in the partial table, and
generating the anonymized table from the table to be anonymized and the anonymized partial table by anonymizing the p master attributes in the table to be anonymized, and
wherein the method further comprises performing attribute deletion, generalization, k-anonymization, Pk-anonymization, or shuffling of an order of L records in the partial table in the anonymization of the table to be anonymized.

4. A non-transitory computer-readable storage medium which stores a program for causing a computer to function as the anonymity evaluation apparatus according to claim 1.

5. The anonymity evaluation method according to claim 3, further comprising generating the first evaluation target table and the second evaluation target table using an overlapping record number table, a record number being a number identifying a record included in the table to be anonymized, the overlapping record number table being a table of 2×L having records of sets of aggregates of record numbers of records of the table to be anonymized which have same sets of values of p master attributes and values of keys which are elements of the aggregates.

* * * * *